United States Patent
Haruno et al.

(10) Patent No.: US 10,199,898 B2
(45) Date of Patent: Feb. 5, 2019

(54) ROTARY ELECTRIC MACHINE STATOR HAVING A RESIN MOLDED PORTION

(71) Applicants: TOYOTA JIDOSHA KABUSHIKI KAISHA, Toyota-shi, Aichi-ken (JP); MATSUO INDUSTRIES, INC., Obu, Aichi Pref. (JP)

(72) Inventors: Kentaro Haruno, Toyota (JP); Haruki Kusamaki, Okazaki (JP); Yuki Yamakawa, Toyoake (JP)

(73) Assignees: TOYOTA JIDOSHA KABUSHIKI KAISHA, Toyota (JP); MATSUO INDUSTRIES, INC., Obu (JP)

( * ) Notice: Subject to any disclaimer, the term of this patent is extended or adjusted under 35 U.S.C. 154(b) by 263 days.

(21) Appl. No.: 15/110,899

(22) PCT Filed: Jan. 14, 2015

(86) PCT No.: PCT/IB2015/000024
§ 371 (c)(1),
(2) Date: Jul. 11, 2016

(87) PCT Pub. No.: WO2015/107411
PCT Pub. Date: Jul. 23, 2015

(65) Prior Publication Data
US 2016/0336829 A1 Nov. 17, 2016

(30) Foreign Application Priority Data
Jan. 15, 2014 (JP) ................................ 2014-005332

(51) Int. Cl.
*H02K 3/32* (2006.01)
*H02K 5/02* (2006.01)
(Continued)

(52) U.S. Cl.
CPC ............... *H02K 5/02* (2013.01); *H02K 3/522* (2013.01); *H02K 5/225* (2013.01); *H02K 5/24* (2013.01)

(58) Field of Classification Search
CPC ... H02K 5/02; H02K 5/225; H02K 5/24; H02K 3/522; H02K 3/32
(Continued)

(56) References Cited

U.S. PATENT DOCUMENTS

2013/0147306 A1* 6/2013 Trammell ................ H02K 3/50
 310/215
2013/0257183 A1* 10/2013 Yokogawa ............... H02K 5/02
 310/43

FOREIGN PATENT DOCUMENTS

JP 2010-142055 A 6/2010
JP 2013-062901 A 4/2013
(Continued)

OTHER PUBLICATIONS

Machine translation of JP 2013128391 A (Jun. 2013).*

*Primary Examiner* — Michael Andrews
(74) *Attorney, Agent, or Firm* — Oliff PLC

(57) ABSTRACT

A rotary electric machine includes a stator core, a coil, and a molded portion. The stator core includes an annular yoke and a plurality of teeth. The teeth protrude radially inward from the annular yoke. The coils are wound around the teeth respectively. The coil includes a coil end that protrudes toward an axially outer side from an axially end surface of the stator core. The molded portion is a resin member that covers the coil end. The molded portion includes a first member. The first member includes a communication portion that communicates inside of the molded portion with outside of the molded portion.

1 Claim, 3 Drawing Sheets

(51) Int. Cl.
*H02K 3/52* (2006.01)
*H02K 5/22* (2006.01)
*H02K 5/24* (2006.01)

(58) Field of Classification Search
USPC .......................................................... 310/43
See application file for complete search history.

(56) References Cited

FOREIGN PATENT DOCUMENTS

| | | | | |
|---|---|---|---|---|
| JP | 2013-121317 A | 6/2013 | | |
| JP | 2013-128391 A | 6/2013 | | |
| JP | 2013128391 A | * 6/2013 | ............... | H02K 5/22 |
| JP | 2013-198218 A | 9/2013 | | |
| JP | 2013-215025 A | 10/2013 | | |

* cited by examiner

ROTARY ELECTRIC MACHINE STATOR HAVING A RESIN MOLDED PORTION

BACKGROUND OF THE INVENTION

1. Field of the Invention

The invention relates to a rotary electric machine stator, and more particularly, to a rotary electric machine stator in which a resin member is molded over a coil end.

2. Description of Related Art

A coil is wound around a stator of a rotary electric machine. A resin member is sometimes molded over a coil end of this coil that protrudes from an axially end surface of a stator core.

Japanese Patent Application Publication No. 2013-62901 (JP 2013-62901 A) describes art related to the invention. In this related art, a resin member in which an intermediate bus bar shaped so as to be able to absorb stress is insert molded, is provided in a stator of a rotary electric machine. This resin member connects lead wires from the stator to a power line via the intermediate bus bar. Also, Japanese Patent Application Publication No. 2013-121317 (JP 2013-121317 A) describes a spacer of an insulating body that has a positioning groove that provides a constant distance between conductors in a stator assembly of an electric motor, in order to prevent the conductors from becoming damaged.

When resin molding a portion of the coil end, air mixes in with molten resin that is then filled into a mold. As a result, air bubbles referred to as voids may form. If air bubbles form in the resin molding, the insulation properties of the electric motor may decrease, and the molded portion may not be sufficiently strong.

SUMMARY OF THE INVENTION

The invention thus provides a rotary electric machine stator in which air bubbles that form at the time of resin molding are able to be removed.

One aspect of the invention relates to a rotary electric machine stator that includes a stator core, coils, and a molded portion. The stator core has an annular yoke and teeth that protrude radially inward from the annular yoke. The coils are wound around the teeth respectively, and the coil includes a coil end that protrudes toward an axially outer side from an axially end surface of the stator core. The molded portion is a resin member that covers the coil end, and includes a first member. The first member includes a communication portion that communicates inside of the molded portion with outside of the molded portion.

The rotary electric machine stator according to the invention has the communication portion that communicates inside of the molded portion with outside of the molded portion. As a result, even if air bubbles form in the molded portion, they can be removed via the communication portion.

The rotary electric machine stator according to the invention may also include a plurality of power cables that are connected to the coil and supply power to the coil from an external power supply. The first member may have a retaining portion. The retaining portion may hold the plurality of power cables together and fix the plurality of power cables to the stator core.

The rotary electric machine stator according to the invention is provided with the communication portion in the retaining member that holds the plurality of power cables together and fixes them to the stator core, so the communication portion is able to be easily formed. With this structure, even if air bubbles form in the molded portion, they can be removed via the communication portion of the retaining member.

Also, in the rotary electric machine stator according to the invention, a bottom surface of the first member may abut against an outer peripheral side of the axially end surface of the stator core. The communication portion may include a groove and the axially end surface of the stator core. The groove is provided in the bottom surface of the first member and extends in the radial direction of the rotary electric machine stator.

Also, in the rotary electric machine stator according to the invention, the communication portion is formed by the groove that is provided in the bottom surface of the first member, and the axially end surface of the stator core. That is, the communication portion may be formed with a simple shape change of just providing the groove in the first member. With this structure, even if air bubbles form in the molded portion, they can be removed via the communication portion of the retaining member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
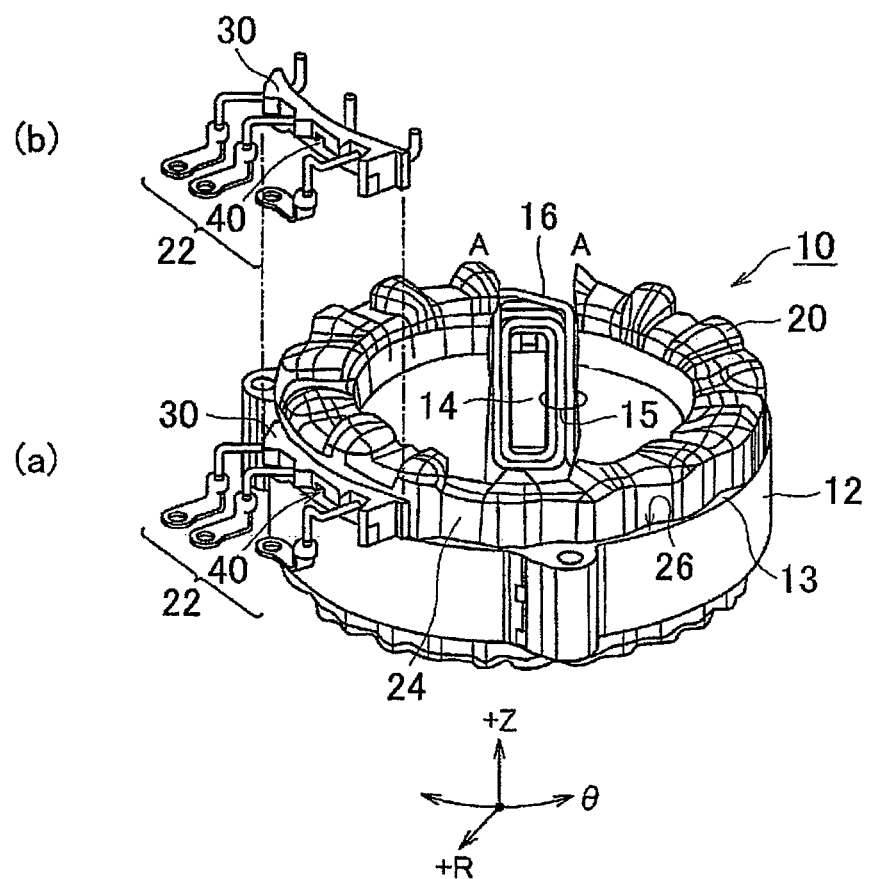
FIG. 1 is a view of a rotary electric machine stator according to an example embodiment of the invention, with (a) being an overall perspective view, and (b) being a view of a fixing member.

Example embodiments of the invention will now be described in detail with reference to the accompanying drawings. Dimensions, shapes, and materials and the like described below are examples for the purpose of description, and may be changed as appropriate according to the specifications and the like of the rotary electric machine stator. Also, in the description below, like elements throughout the drawings will be denoted by like reference characters and redundant descriptions will be omitted.

FIG. 1 is a view of the structure of a rotary electric machine stator 10 used in a rotary electric machine mounted in a vehicle. Hereinafter, unless otherwise specified, the rotary electric machine stator 10 will simply be referred to as "the stator 10". The stator 10 has a structure in which a portion of a coil end is integrated by a resin molding. FIG. 1(a) is an overall perspective view of a portion of a coil with a molded portion removed between reference characters A and A, and FIG. 1(b) is a view of a retaining member that will be described later.

The rotary electric machine that uses the stator 10 is a three-phase synchronous rotary electric machine that is a motor-generator that functions as an electric motor when a vehicle is powering, and functions as a generator when the vehicle is braking. The rotary electric machine is formed by the stator 10 shown in FIG. 1, and an annular rotor that is arranged separated by a predetermined gap on the radially inner side of the stator 10. The rotor is not shown in FIG. 1. FIG. 1 is a view showing a circumferential direction θ of the stator 10, a radial direction R of the stator 10, and a height direction Z of the stator 10. The R direction is a direction in which the direction from an inner diameter side toward an outer diameter side is denoted +R. The direction of a +Z direction will be described later.

The stator 10 includes a stator core 12, a coil 15 that is wound around the stator core 12, and a molded portion 20 in which a coil end 16 is covered by a resin member. The coil end 16 is a portion where the coil 15 protrudes out toward an axially outer side from an axially end surface of the stator core 12. The stator includes at least one coil end. The stator 10 in FIG. 1 includes two coil ends that the coil 15 protrudes out toward the axially outer sides (the +Z direction and the −Z direction) from the axially end surfaces of the stator core 12. The stator 10 is a resin-molded stator. Covering the coil end 16 with a resin member protects the coil end 16 from damage and the like, and enables the insulation properties of the electric motor to be improved. The stator 10 is provided with a first member 30 that includes communication portions 40 and 42 that communicate the inside of the molded portion 20 with the outside of the molded portion 20 in order to remove air bubbles that form when covering the coil end 16 with the resin molding. The first member will be referred to as a fixing member in this example embodiment. The fixing member 30 is a member that fixes and holds power cables 22, which lead out from the coil 15, to the stator core 12. Of the communication portions 40 and 42 that are provided in two locations, the communication portion 42 is covered by another member and is thus not visible in FIG. 1.

The stator 10 includes the stator core 12, the coil 15 that is wound around teeth 14 of the stator core 12, and the molded portion 20. The molded portion 20 is molded out of resin and covers the entire coil 15. In FIG. 1(a), a portion of the molded portion 20 is removed between reference characters A and A to show the teeth 14 and the coil 15.

The stator core 12 is an annular magnetic body part having a plurality of teeth 14 that protrude radially inward from an annular yoke 13. The plurality of teeth 14 are arranged along the circumferential direction on the inner periphery of the yoke 13. The coil 15 is wound around the teeth 14 such that the teeth 14 become magnetic poles. The stator core 12 that is used is formed by a plurality of annular thin magnetic plates that are formed in a predetermined shape that include the teeth 14 and are stacked together. Electromagnetic steel plates may be used for the thin magnetic plates. Magnetic powder that has been integrally molded into a predetermined shape may also be used instead of the stacked body of thin magnetic plates.

With the coil 15, insulation-covered conductors are sequentially wound around the teeth 14 according to a predetermined coil winding method, and electrically connected in the necessary locations so as to form three-phase windings. The predetermined coil winding method in this case is a distributed winding or a concentrated winding.

The molded portion 20 is such that the entire coil end 16 except for wires such as the power cables 22 that must lead out from the coil 15 is covered by a resin member, or the coil end 16 and the stator core 12 are integrated with resin. Covering and integrating the coil end 16 and the stator core 12 with molded insulating resin suppresses vibration of the coil end 16 and enables heat generated by the coil end 16 to be effectively dissipated outside.

Thermosetting resin having excellent formability and heat resistance is used for the resin member that is used in the molding. Epoxy resin or polyimide resin or the like may be used as the thermosetting resin. The resin may also include an appropriate filler.

The power cables 22 are three-phase power lines that lead input/output terminals of the three-phase windings of the coil 15 to the outside and are connected to a high voltage power supply, for example. The three-phase windings have three input/output terminals of different phases, i.e., a U-phase, a V-phase, and a W-phase, so there are three power cables, as shown in FIG. 1. The power cables lead the U-phase terminal, the V-phase terminal, and the W-phase terminal of the three-phase windings of the coil 15 toward the outside of the stator 10, where appropriate connection terminals are attached to them. The U-phase terminal, the V-phase terminal, and the W-phase terminal of the coil 15 may lead outside as they are, but providing suitable relay power lines and connecting one end of each relay power line to the U-phase terminal, the V-phase terminal, and the W-phase terminal, respectively, of the coil 15, and connecting the other end of each relay power line to the corresponding connection terminal facilitates work such as terminal treatment. Hereinafter, suitable relay power lines that are insulation-coated conductor lines will be used as the power cables 22.

The fixing member 30 is an insulating member that holds the power cables 22 together and fixes and holds the power cables 22 in position with respect to the stator core 12. Fixing the position of the power cables 22 by the fixing member 30 facilitates the process of fastening the power cables 22 to the external high voltage power supply line. Moreover, the fixing member 30 serves to communicate the inside of the molded portion 20 with the outside of the molded portion 20, thereby making it easier to remove air bubbles that form when forming the resin molding.

The fixing member 30 is arranged contacting both an outer peripheral side surface 24 of the molded portion 20, and an axially end surface 26 of the stator core 12. There are two axially end surfaces of the stator core 12, but the one on which the fixing member 30 is arranged is the axially end surface 26 on the side where the U-phase terminal, the V-phase terminal, and the W-phase terminal of the coil 15 lead out. In FIG. 1, the axially end surface 26 is positioned on the upper side of the paper on which FIG. 1 is drawn, as opposed to the other axially end surface, so this direction will be the +Z direction.

The fixing member 30 may be a member that is manufactured separately from the molded portion 20, and be such that the three relay power lines for the power cables 22 are insert-molded in a predetermined shape with resin material. A resin for a rotary electric machine that is has chemical resistance, high temperature resistance, and high moisture resistance and the like may be used as the resin material. For example, an aromatic nylon resin compound or the like may be used.

FIG. 2 is a detailed view of the fixing member 30 including the power cables 22. FIG. 2A is an overall perspective view, FIG. 2B is a plan view from the +Z direction, FIG. 2C is a front view, and FIG. 2D is a bottom view from a −Z direction.

Figure 2B:
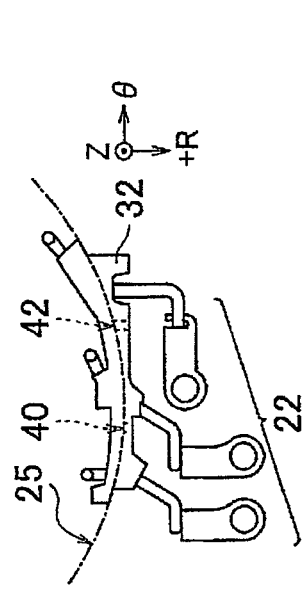
FIG. 2B is a plan view of the fixing member according to the example embodiment of the invention.
Figure 2C:
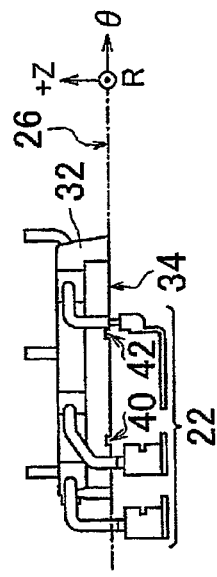
FIG. 2C is a front view of the fixing member according to the example embodiment of the invention.
Figure 2D:
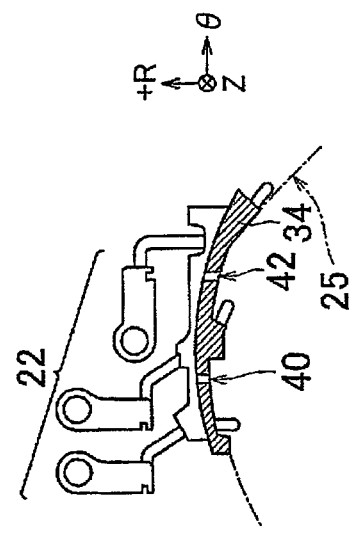
FIG. 2D is a bottom view of the fixing member according to the example embodiment of the invention.
Figure 2A:
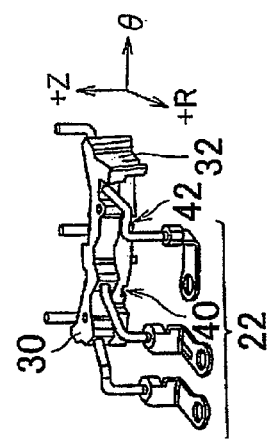
FIG. 2A is a perspective view of the fixing member according to the example embodiment of the invention.

The fixing member 30 has a retaining portion. 32 that holds the power cables 22, and communication portions 40 and 42. The retaining portion 32 is a main body portion of the fixing member 30, and holds the power cables 22 together by insert molding and fixes them to the stator core. The fixing member 30 has a curved surface 25 that corresponds to the outer peripheral side surface 24 of the molded portion 20. The curved surface 25 that is curved in an arc shape is schematically shown in FIGS. 2B and 2D. A bottom surface 34 of the fixing member 30 is a surface that contacts the axially end surface 26 of the stator core 12, as shown in FIG. 2C.

The communication portions 40 and 42 are formed by grooves that are provided in the bottom surface 34 of the fixing member 30 and extend in the radial direction, and the axially end surface 26 of the stator core 12. One end of the communication portions 40 and 42 is open to the curved surface 25, and the other end is open to the outside where the power cables 22 stick out. In this way, the fixing member 30 contacts the outer peripheral side surface 24 of the molded portion 20 with the curved surface 25, and contacts the axially end surface 26 of the stator core 12 with the bottom surface 34, such that the communication portions 40 and 42 provide communication between the inside and the outside of the molded portion 20.

As an example of the size of the grooves that form the communication portions 40 and 42, the width are approximately 1 mm to 2 mm, and the depth is approximately 0.1 mm to 0.5 mm. This is only an example and may be changed as appropriate depending on the size of the stator 10 and the like. Also, there are two communication portions 40 and 42, but this number may also be changed as appropriate depending on the size of the stator 10 and the like. Also, the communication portions 40 and 42 are provided in the fixing member 30 that is made of resin material, and the axially end surface 26 of the stator core 12 is usually a flat surface. Therefore, the communication portions 40 and 42 are able to be formed easily when they are formed in the fixing member 30, so a normal stator core may be employed as the stator core 12.

Figure 3:
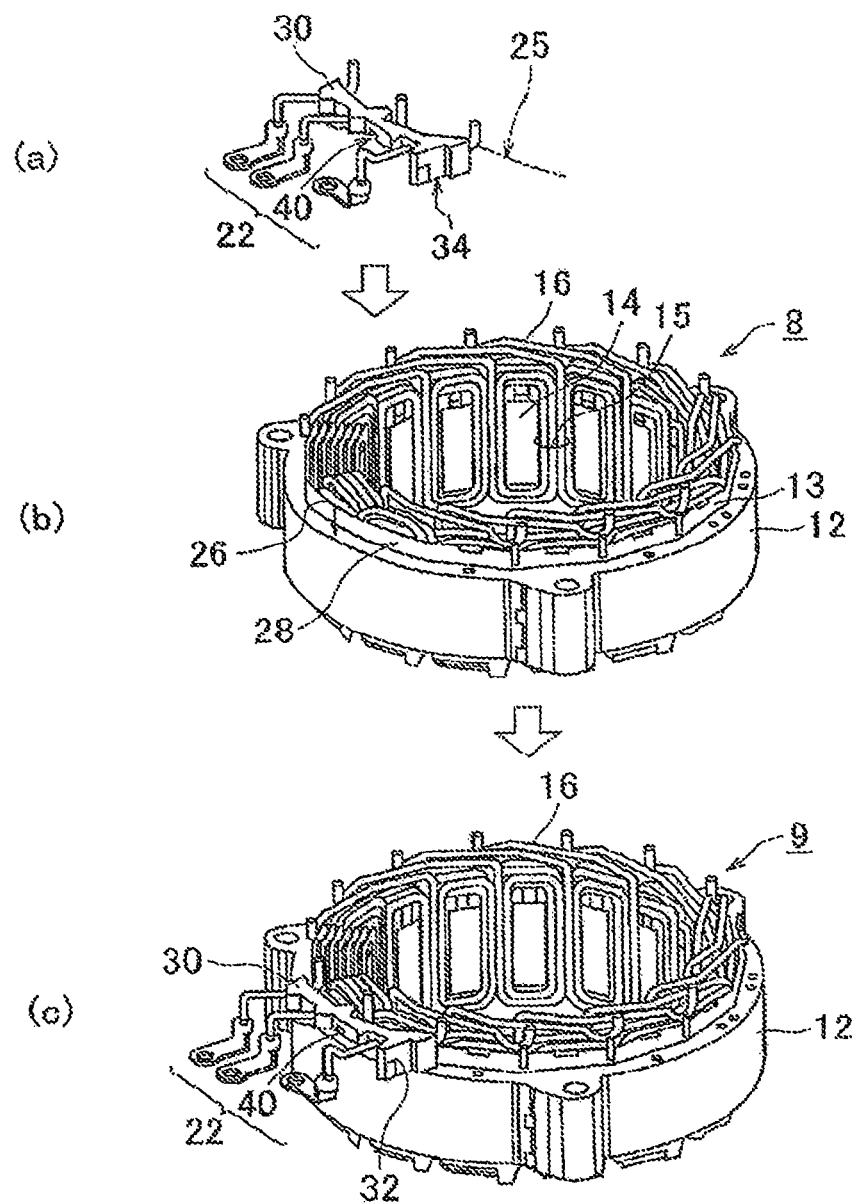
FIG. 3 is a view illustrating the fixing member being attached to the rotary electric machine stator according to the example embodiment of the invention before a resin member is molded over the rotary electric machine stator, with (a) being a view of the fixing member before it is attached, (b) being a view of the rotary electric machine stator before the fixing member is attached, and (c) being a view of the rotary electric machine stator after the fixing member is attached but before the resin member is molded over the rotary electric machine.

FIG. 3 is a view illustrating the order in which the fixing member 30 is arranged on the stator before the resin molding process. FIG. 3(a) is a view of the fixing member 30, and is a perspective view similar to FIG. 2A. FIG. 3(b) is a view of a stator 8 in which the coil 15 is wound around the teeth 14 of the stator core 12. FIG. 3(c) is a view of a stator 9 on which the fixing member 30 in (a) is arranged on the stator 8 in (b).

As shown in FIG. 3(a), the fixing member 30 such as that illustrated in FIG. 2 is prepared. The stator 8 shown in FIG. 3(b) is then obtained by sequentially winding an insulation-coated conductor around the teeth 14 on the stator core 12 according to a predetermined coil winding method. In the drawing, the windings that are wound around the teeth 14 are not yet connected together. An outer peripheral surface 28 of the coil 15 has a polygonal shape that is close to a cylindrical shape. The axially end surface 26 shows the location where the bottom surface 34 of the fixing member 30 will be arranged.

FIG. 3(c) is a view of the stator 9 in which the fixing member 30 in (a) is arranged on the stator 8 in (b). The bottom surface 34 of the fixing member 30 is face-to-face with the axially end surface 26 of the stator core 12, with the curved surface 25 of the fixing member 30 arranged along the outer peripheral surface 28 of the coil 15 across a gap for resin molding. Then, the windings of the coil 15 of the stator 9 are connected together according to a predetermined coil winding method by welding or the like. The U-phase terminal, the V-phase terminal, and the W-phase terminal of the coil 15 are connected by welding or the like to the corresponding terminals of the power cables 22 on the curved surface 25 side of the fixing member 30. Then, resin molding is performed using a mold to obtain the stator 10 shown in FIG. 1.

In this way, the inside and outside of the molded portion 20 are able to be communicated with one another by the simple method of creating the communication portions 40 and 42 by forming grooves in the bottom surface of the fixing member 30 that holds the power cables 22, so air bubbles that form when the resin molding is formed are able to be easily removed outside. As a result, electrical insulation properties of the electric motor are able to be improved, and the molded portion 20 is able to be sufficiently strong. Also, providing the communication portions makes it possible to prevent resin from remaining in a forming die and molding equipment and the like, even when a very small amount of resin leaks between the stator core 12 and the fixing member 30 in the resin molding process. Aside from providing grooves in the bottom surface of the fixing member, the communication portions may also be holes that pass through the fixing member in the radial direction.

In the foregoing description, the fixing member 30 that holds the power cables 22 is used as an example of the first member having the communication portion. Aside from this, a member that is arranged contacting both the outer peripheral side surface of the molded portion and the axially end surface of the stator core may also be used as the first member. For example, when there is a signal wire or the like that leads out of the coil 15 for monitoring the temperature of the coil 15, and a member that retains this signal wire, a communication portion may be provided in this member.

What is claimed is:

1. A rotary electric machine stator comprising:
   a stator core including
      an annular yoke; and
      teeth that protrude radially inward from the annular yoke;
   coil that is wound around the teeth, the coil including a coil end that protrudes toward an axially outer side from an axially end surface of the stator core;
   a molded portion that is a resin member that covers the coil end, the molded portion including a first member, and the first member including a communication portion that communicates inside of the molded portion with outside of the molded portion; and
   a plurality of power cables that are connected to the coil and supply power to the coil from an external power supply,
   wherein the first member includes a retaining portion,
   the retaining portion holds the plurality of power cables together and fixes the plurality of power cables to the stator core,
   a bottom surface of the first member abuts against an outer peripheral side of the axially end surface of the stator core,
   the communication portion is defined by a groove and the axially end surface of the stator core, and the groove is provided in the bottom surface of the first member and extends completely through the first member in a radial direction of the rotary electric machine stator.

\* \* \* \* \*